(No Model.)
B. T. FAIRCHILD.
THERMOMETER GUARD.
No. 577,016. Patented Feb. 16, 1897.
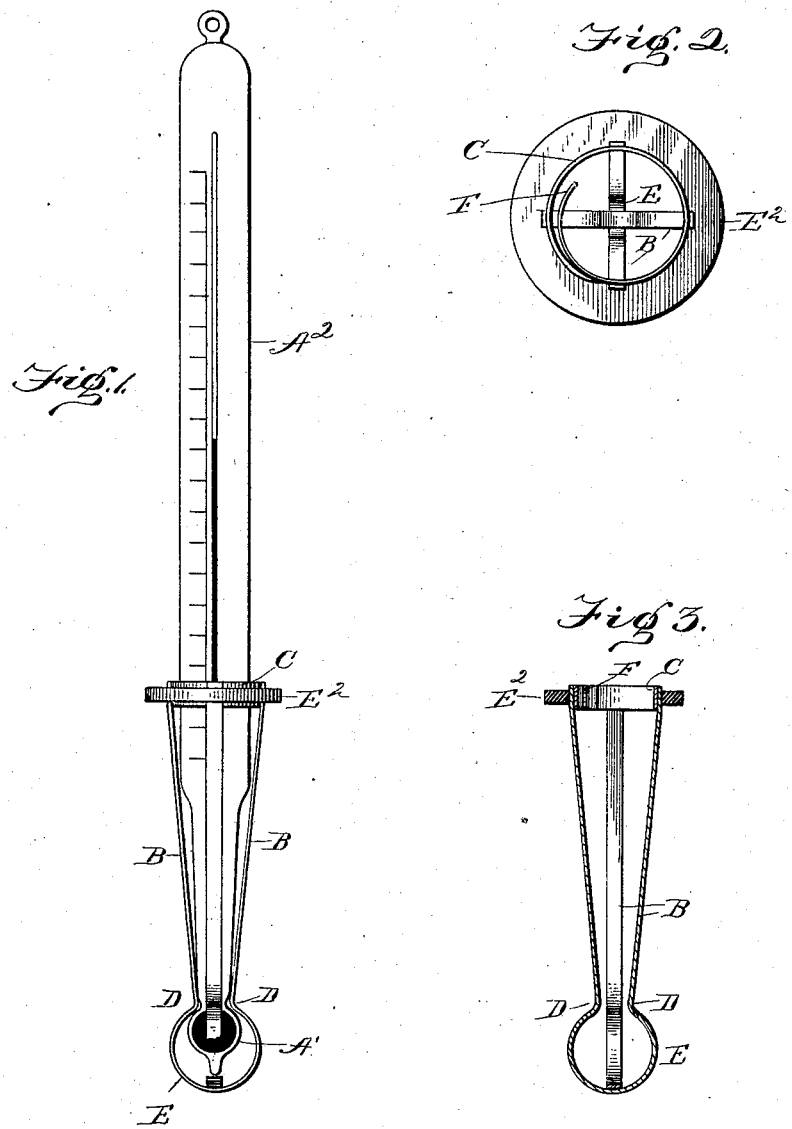
Witnesses:
J. M. Fowler Jr.
Alex J. Stewart
Inventor:
Benjamin T. Fairchild

UNITED STATES PATENT OFFICE.

BENJAMIN T. FAIRCHILD, OF NEW YORK, N. Y., ASSIGNOR TO THE FAIRCHILD BROS. & FOSTER, OF NEW JERSEY.

THERMOMETER-GUARD.

SPECIFICATION forming part of Letters Patent No. 577,016, dated February 16, 1897.

Application filed August 14, 1895. Serial No. 559,245. (No model.)

*To all whom it may concern:*

Be it known that I, BENJAMIN T. FAIRCHILD, of New York, in the county of New York and State of New York, have invented certain new and useful Improvements in Thermometer-Guards; and I do hereby declare the following to be a full, clear, and exact description of the same, reference being had to the accompanying drawings, forming a part of this specification, and to the letters of reference thereon.

This invention relates to improvements in guards for thermometers and scale-aerometers of the kind used in chemical and dairy operations known as "laboratory" and as "dairy" thermometers, and as applied also to all thermometers used in operations where it is desirable or necessary to immerse the thermometer in a fluid or material to ascertain the temperature thereof; for instance, in cooking food, in preparing food for infants and invalids, in the preparation of peptonized foods, &c.

My device is especially adapted and convenient for the use of a thermometer for the preparation of food for infants where it is important to carefully raise the milk to a definite temperature, which can only be done by keeping the thermometer constantly immersed in the fluid and by constant stirring.

Because of the construction and manner of using these instruments they are very liable to be broken, and my device is designed as a safeguard against breakage while the instrument is being used or handled.

My device also renders this instrument useful for the purpose of both a stirring-rod and thermometer. The guard is so arranged that it can be immediately removed from the thermometer after use and both thermometer and guard quickly and thoroughly cleansed, whereas a thermometer in common use with the ordinary metal frame or attachment is objectionable for immersing in fluids, as well as for the reason that they cannot be readily cleansed after such use.

The invention consists in a guard having certain novel details of construction and combinations and arrangements of parts, all as will be now described, and pointed out particularly in the appended claims.

Referring to the accompanying drawings, Figure 1 is an elevation of a guard applied to a thermometer, a portion of the guard being broken away to show the position of the bulb. Fig. 2 is a top plan of the guard on an enlarged scale. Fig. 3 is a vertical section through the same.

Like letters of reference in the several figures indicate the same parts.

The thermometer itself may be of any ordinary type and need not be specifically described, it only being material that it should fit the guard with sufficient accuracy to prevent the accidental separation of the two. The thermometer I have shown consists of a glass tube $A^2$, constituting the mercury-tube and scale-plate and blown into a bulb $A'$ for the mercury at the bottom.

The guard is applied to the lower end of the thermometer and consists of a cage formed by a series of flexible strips B, united at the top by a ring or encircling member C and converging toward the bottom to form a neck at D and then expanding into a head or enlargement E for the bulb of the thermometer.

In the preferred construction the cage is formed of two light and resilient strips of metal, secured to the ring at each end, arranged at right angles to each other and united at the crossing point by solder or otherwise.

The neck or constricted portion of the cage should be of proper internal diameter to clamp the thermometer just above the bulb, thus holding the parts in position with the end of the bulb slightly above the end of the cage, (see Fig. 1,) whereby the chances of breakage are greatly reduced.

To further insure against breakage by contact with the side of the vessel or when laying the instrument down, I provide the top of the cage with an annular elastic buffer $E^2$ at the upper end, and to insure the fitting of the cage around the thermometer at the top or to permit of the use of thermometers of different size I provide the cage with an internal spring F, preferably within the top ring.

To apply the guard, it is slipped over the lower end of the thermometer and the bulb pushed down into the head or enlargement with a steady pressure, forcing the resilient sides of the cage apart in its passage through the constricted portion or neck, the latter immediately closing around the instrument above the bulb and holding the parts in position.

The internal spring at the top holds the guard steady at this point and supplements the action of the annular buffer in breaking the force of shocks transmitted to the thermometer by striking other objects at this point. This spring just referred to is preferably located on one side of the cage. Thus the cage is forced over to one side and occupies an eccentric position, (unless the thermometer is a large one,) thereby preventing the device from rolling when placed on a flat or slightly-inclined support.

Having thus described my invention, what I claim as new is—

1. A guard designed for application to a thermometer or aerometer with a substantially cylindrical body terminating in a substantially spherical bulb at the lower end, consisting of a cage formed of resilient strips united near the upper ends around a central opening for the body of the instrument and conforming approximately to the shape of the lower end of the instrument to which it is applied, the lower portion of the cage being formed with a restricted resilient passage for engaging the instrument immediately above the bulb and terminating in a head or enlargement conforming approximately to the contour of the bulb on the instrument; said head or enlargement being formed by portions of the resilient strips which are extended across the end of the cage substantially as described.

2. A guard designed for application to a thermometer or aerometer with a substantially cylindrical body and tapering lower end terminating in a substantially spherical bulb at the lower end, consisting of a cage formed of resilient strips united by an annulus at the upper end and tapered to approximately conform to the tapered lower end of the instrument to which it is applied, the lower portion of the cage being formed with a resilient passage for engaging the instrument immediately above the bulb and terminating in a head or enlargement conforming approximately to the contour of the bulb on the instrument, and an annular buffer surrounding the upper end of the cage; substantially as described.

3. The combination with the thermometer or aerometer guard, or cage having the ring at the upper end, of the spring located within said ring for holding the thermometer; substantially as described.

4. A thermometer or aerometer guard substantially such as herein described consisting of the strips having their ends united by an annulus or ring and their intermediate portions secured together at the crossing-point and formed into a cage with downwardly-converging sides and an enlargement or head at the lower end, the spring within the annulus or ring and the annular buffer over the outside of the ring; substantially as described.

BENJAMIN T. FAIRCHILD.

Witnesses:
R. B. McMaster,
H. M. Johnson.